Figure 1:
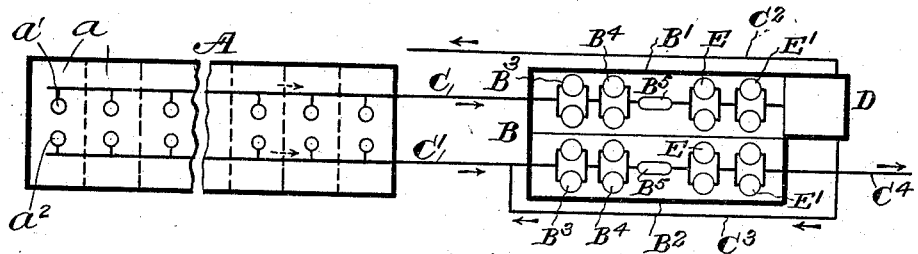

No. 684,590. Patented Oct. 15, 1901.
F. W. C. SCHNIEWIND.
METHOD OF ENRICHING GAS.
(Application filed Jan. 8, 1900.)
(No Model.) 3 Sheets—Sheet 1.

Witnesses: Inventor:

No. 684,590. Patented Oct. 15, 1901.
F. W. C. SCHNIEWIND.
METHOD OF ENRICHING GAS.
(Application filed Jan. 8, 1900.)
(No Model.) 3 Sheets—Sheet 2.
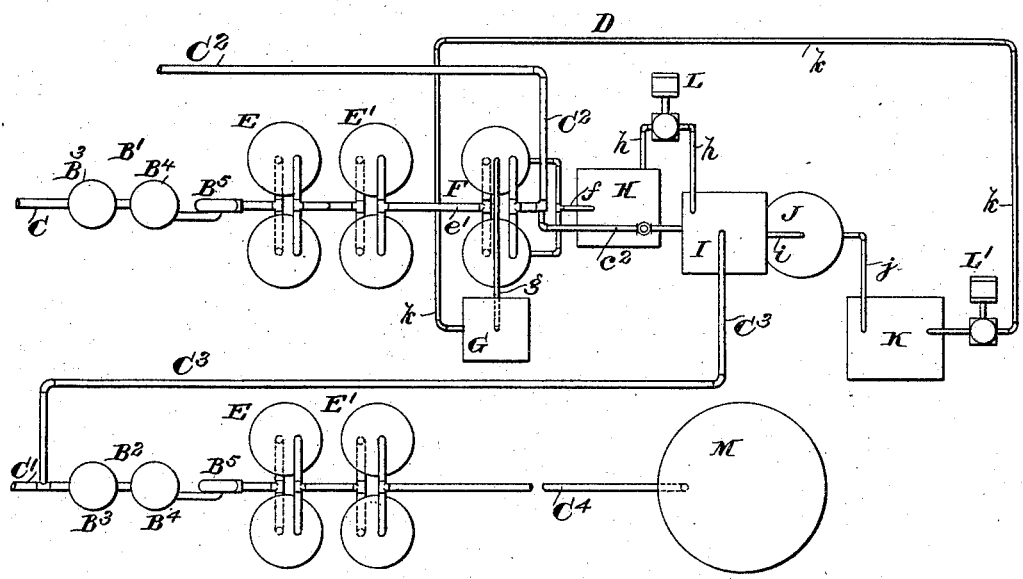
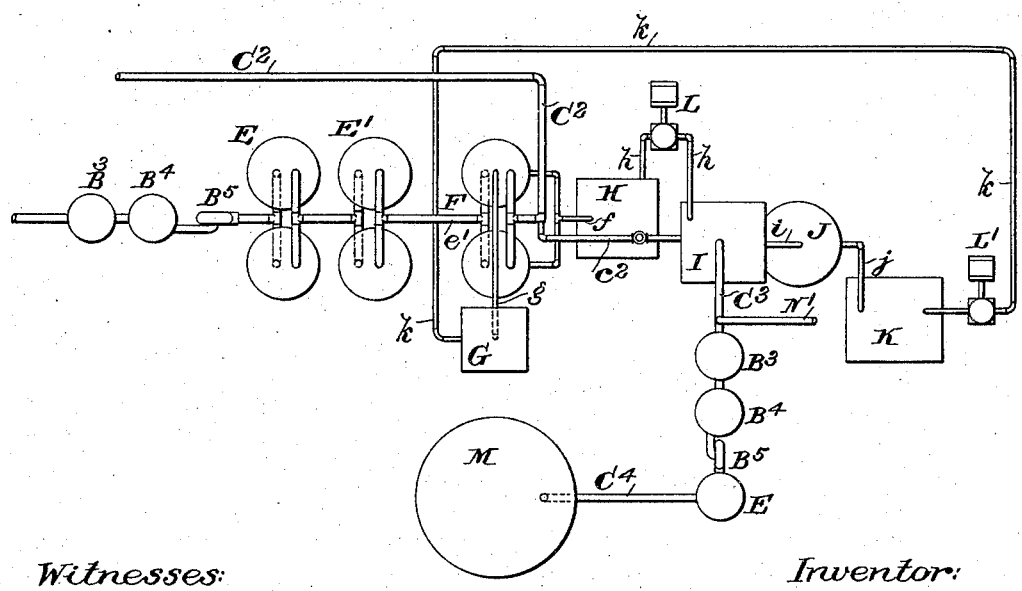

No. 684,590. Patented Oct. 15, 1901.
F. W. C. SCHNIEWIND.
METHOD OF ENRICHING GAS.
(Application filed Jan. 8, 1900.)
(No Model.) 3 Sheets—Sheet 3.
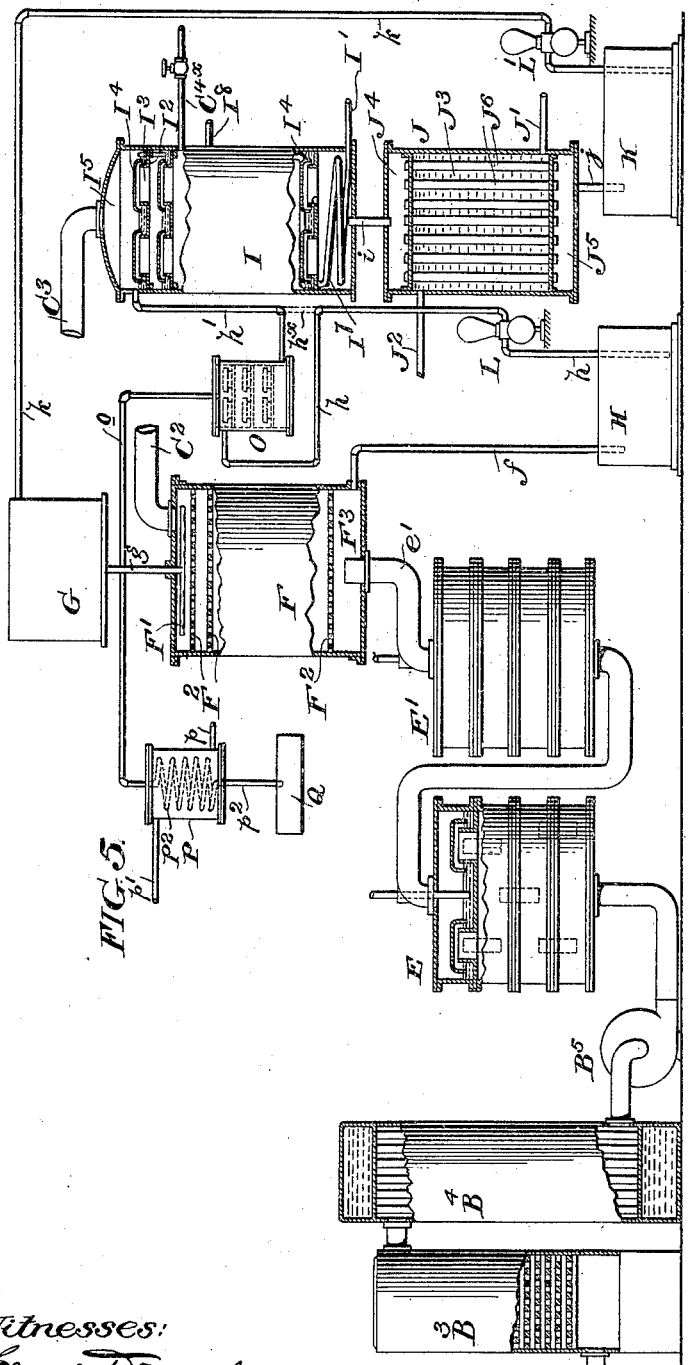
Witnesses: Inventor:

UNITED STATES PATENT OFFICE.

FREDERIC W. C. SCHNIEWIND, OF EVERETT, MASSACHUSETTS, ASSIGNOR TO THE UNITED COKE & GAS COMPANY, OF CHARLESTON, WEST VIRGINIA, AND PHILADELPHIA, PENNSYLVANIA, A CORPORATION OF WEST VIRGINIA.

METHOD OF ENRICHING GAS.

SPECIFICATION forming part of Letters Patent No. 684,590, dated October 15, 1901.

Application filed January 8, 1900. Serial No. 653. (No specimens.)

*To all whom it may concern:*

Be it known that I, FREDERIC W. C. SCHNIEWIND, a citizen of the United States of America, residing in Everett, in the county of Middlesex, in the State of Massachusetts, have invented a new and Improved Method of Enriching Gas, of which the following is a true and exact description, reference being had to the accompanying drawings, which form a part thereof.

My invention relates to a new method of enriching gas, and has for its object particularly the production of a rich illuminating-gas from gases produced as a by-product in the manufacture of coke from bituminous coal, although my method is applicable as well for the treatment of gas produced with other generators than coke-ovens and from other materials than bituminous coal, and I may here note that the chief illuminants in the gas produced by distillation of bituminous coal are benzol and its homologues, as will be more fully set forth below.

In its broadest sense my invention may be said to consist in separating from one volume of gas the illuminants contained in it. Then without further concentration or treatment other than mentioned hereinafter vaporizing or gasifying such illuminants and adding them to another volume of gas in order to increase its illuminating power. Thus the ultimate gases of my process are two distinctly different kinds of gases—viz, first, an illuminating-gas of high candle-power, and, second, a fuel-gas of low or practically no illuminating value.

Of course this process permits the manufacture of more than two qualities of gas, and cases may arise where this is to be recommended; but for simplicity in illustrating my process I will refer in the following description to only two qualities of gas. These two final gaseous products may be obtained from one or more kinds of raw materials treated by the same or different methods, so that we would have the following four distinct cases under my process: Two or more different kinds of gas may be produced, first, from the same raw material by the same method; second, from the same raw material by different methods; third, from different raw materials by the same method, and, fourth, from different raw materials by different methods.

Discussing the four different cases, the following may be mentioned:

First. Production of two (or more) different kinds of gas from the same raw material by the same method: In all gas-generating plants, and particularly in coke-ovens considered as gas-generating plants, the quality and richness of the gases produced vary very considerably at different stages of the operation, and an important feature of my invention consists in drawing off separately the richer and poorer gases produced in the several units of the generating plant, as is, for instance, fully described in my prior patent, No. 627,595, dated June 27, 1899, treating the poorer gases in order to separate from them the illuminants, (chiefly benzol and its homologues,) then vaporizing such separated ingredients, and mixing them with the richer gas in order to increase its illuminating power. Thus the illuminants of the poor gas are transferred to the rich gas and two different kinds of gas—an illuminating-gas of high candle-power and a fuel-gas of low or practically no illuminating value—are obtained from the same raw material. The fuel-gas may be used either for heating the gas-generators (coke-ovens, for instance) or for any other purpose, in which case the heat for the distillation process would be obtained by another fuel. In ordinary coal-gas practice—*i. e.*, either ordinary gas-retorts or coke-ovens—the process would be carried out approximately as follows: All the gas developed from the coal charge immediately after filling the retort is collected for a certain number of hours into one set of mains, (which we may call "rich-gas" mains.) This rich gas is then freed of tar and ammonia in the usual way and subsequently passed through purifiers for the removal of sulfur compounds, also in the usual way. After a certain length of time the valves between the retorts and the rich-gas mains are closed and another set of corresponding valves between the retorts and another main (called the "poor-gas" main) is opened. This poor gas is then also deprived of tar and ammonia in the usual way;

but after the removal of these impurities the illuminants are taken out by processes described farther on. A gas remains with a low or practically no illuminating value, which then passes back to the retorts to heat the same. The time of the change of valves indicated above is so calculated that this second or poor gas will be sufficient to keep the retorts at the desired temperature. The poor gas may also be used for other purposes than heating the retorts, in which case another source of heat is to be provided. The illuminants which have been removed from the poor gas are then gasified or vaporized and added to the rich gas, by which process the candle-power will be increased.

Second. Production of two (or more) different kinds of gas from the same raw material by different methods: By the words "different methods" I wish to have understood two different cases—namely, either the use of two different types of generators or the use of the same type of generator under a distinctly different method of operation. To illustrate these two cases, I will mention the combination for the first case of a bench of gas-retorts in which bituminous coal is carbonized and a battery of coke-ovens in which the same coal is carbonized for the manufacture of metallurgical coke. The illuminants from the entire coke-oven gas may then be transferred to the coal-gas obtained from the bench. The other case would be illustrated by the following example: Two batteries of exactly the same type of coke-ovens would be charged with the same coal. One battery would be operated at low temperature, and thus would yield soft coke and a rich gas, while the other battery would be operated at high temperature, and would thus produce a hard coke, suitable for metallugical purposes, and a poor gas. The illuminants of this latter gas would then be removed and transferred to the rich gas from the first battery.

Third. Production of two (or more) different kinds of gas from different raw materials by the same method: This case may be illustrated by the use of two sets of coke-ovens of exactly the same type and operated at practically the same temperatures. In one battery a highly-volatile coal, which would give a rich gas, would be carbonized. In the other battery a coal yielding little gas but a good metallurgical coke would be carbonized. The entire gas production of the latter battery may be deprived of its illuminants, which could then be added to the richer gas from the first battery.

Fourth. Production of two (or more) different kinds of gas from different raw materials and by different methods: This case would be similar to that described in the second case. The highly-bituminous coal would be charged into the gas-benches, while the coke-ovens would receive charges of less bituminous coking-coal. The illuminants from the coke-oven gas could then be transferred to the gas produced from the benches.

In all the above cases I have used examples for illustration based upon the dry distillation of coal. Not only other raw materials may be used, but also different processes for manufacturing gases may be employed—as, for instance, the water-gas and producer-gas processes. The producer-gas may be used for heating the retorts, making the entire gas production available resulting from the dry distillation of coal. There may also cases arise in which the coal, by the dry-distillation process, would give an entirely unsatisfactory gas with a high percentage of impurities. Then a water-gas could be produced from a suitable kind of fuel, and all the illuminants from the coal-gas could be added to the water-gas after the proper purification.

*Nature and distribution of illuminants.*—Bituminous coal—the most important raw material for the manufacture of gas, which I will, therefore, use for the illustration of my process—will produce "coal-gas" when subjected to dry distillation in closed retorts. The quantity and illuminating value of this coal-gas varies considerably with the character of the coal. It has been found that about sixty-five to eighty per cent. of the illuminating value of such coal-gas is due to benzol and its homologues and about twenty to thirty-five per cent. to hydrocarbons of the paraffin series, (ethylene and homologues.) Almost all the benzol produced during the dry distillation of the coal remains in the gas after it leaves the condensing plant. Thus of the total benzol yielded by a certain coal there was found ninety per cent. in the gas and ten per cent. in the tar.

A certain coal when subjected to dry distillation in a modern by-product oven yielded about ten thousand cubic feet of gas per gross ton. There were approximately five thousand cubic feet (the first fraction) available as a surplus after applying the remaining five thousand cubic feet (the second fraction) for heating the retorts. It was found that in the first fraction were contained about sixty-two per cent. of the total illuminants produced, including benzol and its homologues and ethylene and its homologues, while the second fraction contained about thirty-eight per cent.

*Removal of illuminants from gas.*—Several methods are applicable for the removal of the illuminants. These depend chiefly upon the nature of the same. I do not want to confine myself to any particular method, but in order to illustrate my process I will describe herewith the method mostly in use for the removal of benzol and its homologues from ordinary coal-gas. Two different methods have been in use—viz., first, the cooling process, according to which the benzol and its homologues were condensed by exposing the gas to low temperature, and, second, the absorption process. The absorption process is very much more practiced than the cooling process, and I will therefore describe the same shortly. The gas is brought into contact with or thoroughly scrubbed by a substance, generally a tar-oil, which has the property of absorbing benzol and similar hydrocarbons. In this absorption process the tar-oil enters the benzol-washer generally with a low percentage of benzol and leaves it with about twelve to fifteen per cent. of benzol, and in my preferred mode of practicing my process I conduct the oil after it has absorbed its proper proportion of benzol into a benzol-still, in which the benzol or portion of benzol absorbed in the gas-washer is thrown off as a distillate which, without further concentration, I conduct to and mix with the gas to be enriched. In the operation of the benzol-still material benefit will be found from forcing through the still a volume of gas which rapidly carries away the benzol distillate and passes with it to the gas-conduit containing the gas with which it is to be mixed. Instead of using a benzol-still the gases may also be expelled from the tar-oil by utilizing the heat contained in the crude gases leaving the gas-retorts. This can be done in two different ways, viz: The heat can either pass around a receptacle in which the tar-oil rich in benzol is contained, thus expelling the benzol, or the tar-oil may be sprayed in a suitable apparatus against the gas to be enriched. In the former method the tar-oil is available for another absorption of benzol from the poor gas. In the second the tar-oil is mixed with the tar condensing from the gas and could be made available only by distillation of this tar.

*Purification of illuminants.*—I do not want to subject the benzol vapors or any gases or vapors of illuminants to any treatment except their vaporization or gasification and the removal of any injurious substances in case they are present. On the contrary, I prefer to add these vapors or gases of illuminants directly to the gas to be enriched. It is, however, well known that with the benzol are frequently found sulfur compounds, especially bisulfid of carbon. This may be easily separated from the benzol and its homologues on account of the great difference of the boiling-points, which are the following: bisulfid of carbon, 47° centigrade; benzol, 80.4° centigrade; toluol, 111° centigrade; xylols, from 137.5° to 142° centigrade. It would be of great disadvantage to add these injurious substances to the gas to be enriched. I therefore advise in case of a large percentage of bisulfid of carbon being present the use of a suitable still placed between the benzol-washers and benzol-still, (by which a high degree of fractionation is reached,) and the tar-oil is then permitted to enter the benzol-still only after the sulfur compounds have been practically removed. The vapors or gases of illuminants leaving the benzol-still are then mixed with the rich gas. This would be done in both instances, whether the tar-oil, rich in benzol and its homologues, is distilled or whether the benzol and its homologues are obtained by the distillation of crude coal-tar, as described hereinafter. These impurities may also be removed from the illuminants by chemical processes—as, for instance, in case of bisulfid of carbon, by treating them with sulfids, such as the sulfids of the alkaline earths or alkalies and ammonia.

*The mixing of the illuminants with gas.*—It is well known that cold coal-tar when brought in contact with coal-gas absorbs a considerable amount of benzol and its homologues from the gas. In order to avoid such loss of benzol, it will therefore be advantageous to add the illuminants to the gas after the tar has been removed from it. This would be in the ordinary gas-house practice at the inlet of the ammonia scrubbers or washers. I prefer to pass the gas with these added illuminants through such scrubbers instead of adding the illuminants at the outlet of the same in order to afford by the scrubbing process an opportunity for the depositing of such heavier illuminants or such excess of illuminants which the gas would not be able to carry. It must be mentioned, however, that under certain circumstances—for instance, in case of the presence of a large amount of naphthalene and similar complex hydrocarbons in the crude gas—the addition of the illuminants at a point nearer to the inlet of the condensing system may be found advantageous. The presence of a large amount of light hydrocarbon vapor, such as benzol, would prevent the deposition of the heavier and solid hydrocarbons (naphthalene, &c.) in crystalline form in the condensers, coolers, scrubbers, washers, exhausters, &c., because small amounts of benzol and its homologues, which separate simultaneously with the heavier hydrocarbons, render them liquid, and thus permit their removal together with the tar and gas liquor. The interior surfaces of coolers and condensers especially will thus be less liable to become coated with crystals of naphthalene, &c., which coating materially reduces their efficiency.

Ordinarily only a small percentage of benzol goes into the tar, as stated above. By the addition of illuminants, as just described, the amount of benzol going into the tar would necessarily increase. In case the gas-works are connected with a tar-distillation plant the entire amount of benzol combined with the tar could easily be recovered by returning the first fractions of the tar distillation to the coal-gas, together with the other illuminants. Of course the passing of gas through the tar-still during the expulsion of such illuminants and the eventual previous removal of carbon bisulfid or the purification of the illuminants would be the same as mentioned in the description of the operation of a benzol-still on tar-oil saturated with benzol.

Figure 2:
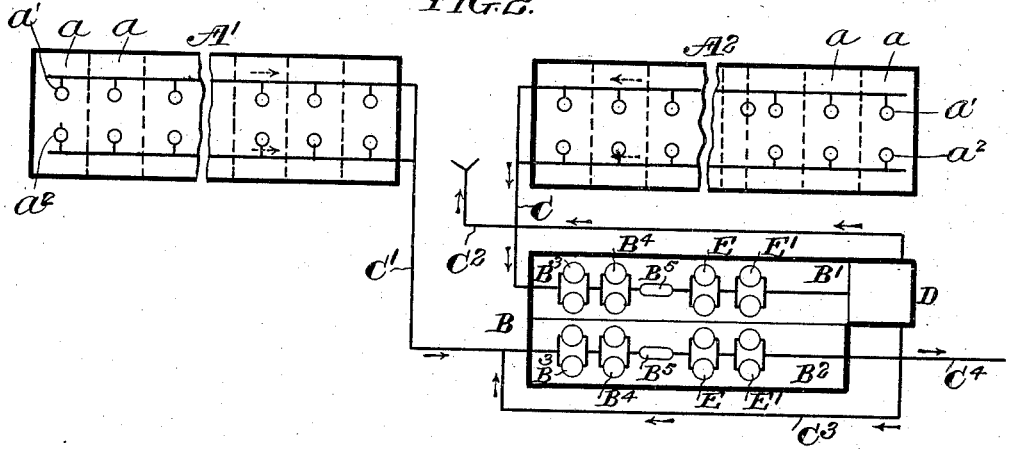
Figure 3:
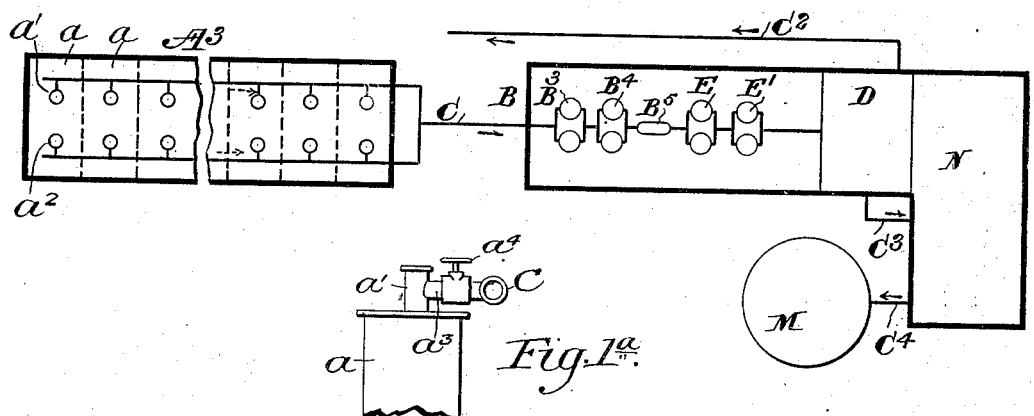

Reference now being had to the drawings, in which I have illustrated, diagrammatically, plants adapted for the practice of my process, Figure 1 is a diagrammatic illustration showing the arrangement of a plant embodying a bank of coke-ovens or gas-retorts or other generators from which the richer and poorer gases produced at different stages of the coking operation are drawn off in separate mains. Fig. 1$^a$ is a detail showing the connection of an oven with one of the gas-take-off pipes. Fig. 2 indicates a plant in which the gas to be enriched is drawn from one set of generators and the gas furnishing the illuminants from another and independent bank of generators. Fig. 3 indicates a plant in which the gases drawn from a bank of coke-ovens are treated for the extraction of benzol, which is then used to enrich gas produced as by a water-gas generator. Fig. 4 is a plan view of the portion of the plant indicated in Figs. 1 and 2, in which the gases are purified, the benzol extracted from the poorer gas and mixed with the richer gas. Fig. 5 is a diagrammatic elevation of such a plant with parts of the apparatus indicated in greater detail, and Fig. 6 is a diagrammatic plan view of the purifying and benzol-extracting portion of the plant as it is indicated in Fig. 3.

A, Fig. 1, indicates a bank of coke-ovens or other set of generators, each connected with a main for poor gas (indicated at C) and a main for rich gas, (indicated at C',) the apparatus being preferably such as is indicated in my former patent, No. 627,595, dated June 27, 1899.

A', Fig. 2, indicates a bank of coke-ovens or generators connected with the rich-gas main C', while A$^2$ indicates a bank of coke-ovens connected with the poor-gas main C, while A$^3$, Fig. 3, indicates a bank of coke-ovens connected with the condensing-house through a single gas-main, (indicated at C'.)

In each figure showing a bank of coke-ovens I have indicated the individual ovens by the symbol $a$, showing each oven as having connections $a'$ and $a^2$ with the respective take-off pipes C and C', and in Fig. 1$^a$ I have shown how the connection from the oven to each pipe C or C' is controlled by a valve $a^4$, which may be situated in a cross-connecting pipe $a^3$, as shown.

B, Figs. 1, 2, and 3, indicates the condensing-house, which, as shown in Figs. 1 and 2, is divided into two separate condensing plants, (indicated at B' and B$^2$,) while in the case shown in Fig. 3 a single condensing plant is situated in the house B, through which all the gases from the coke-ovens are passed. The condensing and purifying apparatus situated in the condensing-house may be of any approved character. I have indicated the presence of condensers B$^3$ and B$^4$, followed by gas-washers, (indicated at E and E',) a suction-blower B$^5$ being situated in the conduit connecting the condensers B$^4$ and the washers E. I have already indicated the connections of the conduits shown at C and C', and will further state here that C$^2$ indicates a conduit for the poor gas leading from the benzol-house, (indicated at D,) preferably, in case my method is used in connection with a coke-oven plant, back to the ovens.

C$^3$ indicates the conduit for benzol vapors leading from the benzol-house D to the rich-gas main C', or, as shown in dotted lines in Figs. 1 and 2, to a point in the condensing plant B$^2$. V and V' indicate valves in pipes C$^3$ and $c^3$, and C$^4$ indicates the conduit for the enriched gas, leading from the condensing plant B$^2$ to a place of storage or use—for instance, a gas-holder M.

In the benzol-house D is conveniently placed a plant, such as is indicated best in Fig. 5, consisting, first of all, of a benzol-washer F, in the head of which is situated an oil distributing and supplying device, (indicated at F',) below which the washer is filled with trays, such as are indicated at F$^2$, over which the oil flows and under and between which the gases pass upward. Below the trays is the oil-collecting chamber, (indicated at F$^3$,) into which also enters the end of the conduit $e'$, leading from the gas-washer E', and from which leads the oil-pipe $f$.

G is an oil-tank connecting with distributing device F' by a pipe $g$, and from the top or head of the benzol-washer leads the poor-gas pipe C$^2$.

H is an oil-tank to receive the oil from the washer F, from which leads a pipe $h$, having situated in it a pump L, by means of which the oil is drawn from the tank H and forced into the head of the benzol-still, (indicated at I.) The oil may be passed directly through pipe $h$ $h^×$ $h'$ to the still, but, preferably, I pass it first through a bisulfid-of-carbon still, as indicated at O, and in which the oil is heated to a point sufficient to drive off the bisulfid without vaporizing the benzol. The oil then passes to the benzol-still, which should be situated below the bisulfid-still, through pipe $h'$ and the bisulfid vapor through pipe $o$ to a condenser, (indicated at P,) $p$ and $p'$ indicating inlet and outlet for water and P$^2$ a coil in the condenser-tank connecting at top with pipe $o$ and at bottom, through pipe $p^2$, with a bisulfid-receptacle Q.

I' is a steam-supply pipe leading through the bottom of the still, as shown, into a heating-coil I$^7$, of which I$^8$ is the outlet. The still is divided horizontally by a series of perforated partitions I$^2$, capped in the usual way, having upwardly-extending flanges I$^3$ capped, as indicated at I$^4$, the construction being a familiar one, by means of which the oil passing down from partition to partition is constantly brought into contact with the coil I$^7$. From the head I$^5$ of the still leads the benzol-conduit C$^3$, and by preference I also provide a gas-conduit—as, for instance, pipe C$^{4×}$, Fig. 5—by which gas is led into the still, preferably from the rich-gas pipe C$^4$. From the bottom of the benzol-still a pipe $i$ leads into an oil-cooler, (indicated at J.) This cooler is divided into three chambers $J^3$, $J^4$, and $J^5$, the end chambers $J^4$ and $J^5$ being connected by pipes $J^6$, which pass through the chamber $J^3$. $J'$ indicates a water-pipe entering the bottom of the chamber $J^3$, and $J^2$ a waste-water pipe leading from the top of said chamber, while $j$ is a pipe leading from the lower compartment into an oil-tank K, from which tank a pipe $k$ leads to the oil-tank G, L' indicating a pump which draws the oil from tank K and forces it into the tank G.

At N, Fig. 3, I have indicated the presence of a water-gas plant, and in Fig. 6 I have shown a pipe N' leading from a water-gas generator (not shown) through scrubbers, condensers, and washers, (indicated at $B^3$, $B^4$, and E.)

The poor gas which is to be treated for the extraction of benzol passes from the generating plant through conduit C to the condensing plant, (indicated at B',) and after having been deprived of its tars and certain other impurities it passes into the bottom of the benzol-washer F, through which a constant flow of tar-oil is maintained, which absorbs practically all of the benzol in the gas, the impoverished gas passing off through the pipe $C^2$ to the coke-ovens or other points of use. The tar-oil drawn from the tank G and passing through the washer F is collected in the tank H and pumped up through the pipe $h$ into the head of the benzol-still, (indicated at I,) where the benzol or the greater part of it is extracted from the oil as it passes down through the still, the benzol vapors passing through the pipe $C^3$ to a connection with the main C', in which the rich gases are passed to condensing plant $B^2$. Ordinarily the benzol should mix with the rich gas in the condensing plant between the condensers and scrubbers, the valve V, Figs. 1 and 2, being closed and the valve V' open. In cases, however, where the gas contains a great deal of naphthalene, which tends to clog the condensers, the valve V' is closed, the valve V open, and the benzol mixed with the rich gas before it enters the condensers, serving to prevent deposits of naphthalene therein. The impoverished tar-oil from the still is cooled in the oil-cooler J, collected in the tank K, and pumped through the pipe $k$ back into the supply-tank G, which feeds the washer F. A regulated amount of rich gas may be permitted to enter the benzol-still through the pipe $C^4$ or any other convenient gas-pipe.

In the foregoing description and in the claims I speak in a general way of extracting the illuminants from a relatively poor body of gas and mixing them with a relatively richer body of gas. It is proper for me to note, however, that in the operation of some generators, particularly of coke-ovens, it is advantageous to make not only a division of the gas produced into a relatively rich and relatively poor gases, but a further division of the poor gas, treating only the portion of such gas as contains a commercially valuable amount of illuminants for the extraction of such illuminants.

As I have referred to the use of the benzol or other illuminants saved from the poorer fraction of gases as an enricher of water-gas, it is proper that I should note also that when so used a certain amount of coal-gas should be mixed with the water-gas, as without such admixture the benzol has a strong tendency to condense in the pipe system.

In a copending application for Letters Patent of the United States, Serial No. 2,436, filed January 23, 1900, for a process of utilizing benzol from tars in the manufacture of gas I have claimed subjecting a body of tar containing benzol and its homologues to fractinal distillation, separating first the bisulfid of carbon, then the benzol, together with such other illuminants as accompany it during its distillation, and mixing the benzol fraction of the distillates and its accompanying illuminants with the gas to be improved in quality. In said application I have also claimed improving the quality of gas by subjecting it to the usual treatment by cooling and washing to remove impurities, subjecting a body of tar containing benzol and its homologues to fractional distillation, separating first the bisufid of carbid, then the benzol, and mixing the benzol fraction of the distillates with the gas to be improved in quality before its purification by cooling and washing is completed. In said application I have also claimed the method of saving illuminants and preventing the deposition of solid hydrocarbons in the condensing and purifying apparatus and mains by removing the tar from the crude gases by the usual cooling and washing operations, then fractionally distilling said tar to drive off, first, the bisulfid of carbon; second, the benzol and its homologues and then the distillates of higher boiling-point, and finally adding the benzol fraction of the distillates to the gases from the generator before they are freed from tar, as aforesaid. In said application I have also claimed in the manufacture of gas in closed externally-heated retorts the method of improving its quality, which consists in separating the richer and poorer gases generated, subjecting a body of tar containing benzol and its homologues to fractional distillation, separating first the bisulfid of carbon and in this stage of the distillation forcing some of the poorer gases through the still to facilitate the process, then separating the benzol and at this stage of the distillation forcing some of the richer gases through the still and mixing the benzol and gas from the still with the richer gas, and finally separating the distillates of higher boiling-point and during this latter separation forcing some of the poorer gases through the still.

In another copending application for Letters Patent of the United States, Serial No. 2,313, filed January 22, 1900, for a method of treating and utilizing gases I have claimed the method of utilizing the gases generated in carbonizing carbonaceous fuels in closed externally-heated retorts, which consists in drawing off the richer gases generated in the first part of the carbonizing process for separate use as illuminating-gas or otherwise and drawing off the poorer gases generated during later stages of the carbonizing operation into separate receptacles and treating said poorer gases only for the removal of their illuminants. I have also claimed therein the same method in connection with the further step of utilizing said poorer gases after their illuminants have been extracted for heating the gas-generating retorts. I have also claimed therein the same method in connection with the further step of separating admixed bisulfid of carbon from the illuminants recovered. I have also claimed therein the separation of the richer and poorer gases, as above described, in connection with the further step of washing said poorer gas with oil in order to separate the admixed illuminants and recovering said illuminants by distillation. Furthermore, as a particular modification of the method last referred to I have claimed the same steps in connection with recovering said illuminants free from bisulfid of carbon by fractional distillation. Finally I have claimed in said application the method of separating the gases into richer and poorer gases, as above described, subjecting the poorer gases to a condensing and washing treatment in order to remove tars and other impurities and then to a washing with oils in order to remove its admixed illuminants.

Having now described my invention, what I claim as new, and desire to secure by Letters Patent, is—

1. The method of enriching a body of gas, which consists in removing from another body of gas the benzol, together with accompanying percentages of other enriching hydrocarbon illuminants, then subjecting both the removed benzol and the other said illuminants to vaporization and adding the resultant combined vapors to the body of gas to be enriched, whereby the expense and loss of illuminants due to separation of the benzol by condensation from the other vaporized illuminants before utilizing it as an enriching agent are avoided.

2. The method of operating a gas plant, which consists in producing therein two separate bodies of gas, removing from one of said bodies the benzol, together with accompanying percentages of other enriching hydrocarbon illuminants, removing the tarry matter from the second body of gas, then subjecting the removed benzol and the other said illuminants to vaporization, and adding the resultant combined vapors to the second body of gas in order to enrich it.

3. The method of operating a gas plant, which consists in producing therein two separate bodies of gas, removing from one of said bodies the benzol, together with accompanying percentages of other enriching hydrocarbon illuminants, removing the tarry matter from the second body of gas, then subjecting the removed benzol and the other said illuminants to vaporization, adding the resultant combined vapors to the second body of gas in order to enrich it, and then treating the mixed gas and vapor to remove ammonia and other impurities.

4. The method of operating a gas plant, which consists in producing therein two separate bodies of gas, removing from one of said bodies the benzol, together with accompanying percentages of other enriching hydrocarbon illuminants, separating from the removed benzol and other illuminants any admixed bisulfid of carbon, then subjecting the removed benzol and the other said illuminants to vaporization and adding the resultant combined vapors to the second body of gas in order to enrich it.

5. The method of operating a gas plant, which consists in producing therein two separate bodies of gas of relatively high and low illuminating value respectively, removing from the poorer-gas body the benzol, together with accompanying percentages of other enriching hydrocarbon illuminants, then subjecting both the removed benzol and the other said illuminants to vaporization, and adding the resultant combined vapors to the richer-gas body to increase its value.

6. The method of operating a gas plant, which consists in producing therein two separate bodies of gas of relatively high and low illuminating value, removing from the poorer-gas body the benzol, together with accompanying percentages of other enriching hydrocarbon illuminants, then subjecting both the removed benzol and the other said illuminants to vaporization, adding the resultant combined vapors to the richer-gas body to increase its value, and then subjecting the enriched gas to a condensing operation to remove impurities.

7. The method of operating a gas plant, which consists in producing therein two separate bodies of gas of relatively high and low illuminating value, removing from the poorer-gas body the benzol, together with accompanying percentages of other enriching hydrocarbon illuminants, then subjecting both the removed benzol and the other said illuminants to vaporization, adding the resultant combined vapors to the richer-gas body to increase its value, and then subjecting the enriched gas to a condensing and washing operation to remove ammonia and other impurities.

8. The method of gas-making, which consists in producing a rich gas from a given body of coal, subsequently producing a poorer gas from the same body of coal, robbing the poorer gas of its illuminants, and adding them to the richer gas.

9. The method of enriching gas which consists in scrubbing a portion of gas with oils having the property of absorbing benzol in order to extract the benzol and other soluble illuminants therefrom, then distilling off the benzol and other illuminants from the oils and mixing the distillate of benzol and other illuminants without further condensation with another portion of gas in order to enrich it.

10. The method of enriching gas which consists in passing such gas from a generator through a purifying system, scrubbing another portion of gas with oils having the property of absorbing benzol in order to extract the benzol and other soluble illuminants therefrom, then distilling off the benzol and other illuminants from said oils and mixing the distillate of benzol and other illuminants with the gas to be enriched before or during its treatment in the purifying system so as to eliminate the impurities in the distillate of benzol and other illuminants at the same time as those in the gas to be enriched.

11. The method of enriching gas drawn from a multiple series of generators which consists in passing the gas from those generators producing relatively rich gas through a purifying system and thence to a place of use or storage, and at the same time passing the gases from those generators producing poorer gases through an oil-scrubbing treatment to absorb the benzol and other soluble illuminants in said gas, distilling off the benzol and other illuminants from said oils and mixing said distillate of benzol and other illuminants with the richer gas in order to enrich it.

12. The method of enriching gas drawn from a multiple series of generators which consists in passing the gas from those generators producing relatively rich gas through a purifying system and thence to a place of use or storage, and at the same time passing the gases from those generators producing poorer gases through an oil-scrubbing treatment to absorb the benzol and other soluble illuminants in said gas, distilling off the benzol and illuminants from said oils and mixing said distillate of benzol and other illuminants with the richer gas as or before it is purified in order to enrich it and eliminate the impurities in the richer gas and the distillate of benzol and other illuminants simultaneously.

13. The method of producing a high illuminating-gas from gases generated in two or more generators which consists in drawing off separately the gases of relatively high and low illuminating value, subjecting the poorer gases first to a condensing and scrubbing operation to remove tars and other impurities and then to a washing with oils having the property of absorbing benzol to remove such benzol and other soluble illuminants as the gases carry with them, then distilling said oils to drive off the benzol and illuminants, mixing the distillate of benzol and other illuminants with the rich gases drawn from the generators and then subjecting the mixed gas and said distillate to a condensing and washing operation to remove ammonia and other impurities.

14. The method of producing a high illuminating-gas from coke-ovens which consists in drawing off separately the rich and poor gases produced in a multiple series of ovens, scrubbing the poor gases with oil to eliminate and absorb the benzol and other soluble illuminants contained in said gases, then distilling the oils to recover the absorbed benzol and other illuminants and mixing the distillate without further condensation with the rich gases from the ovens and finally subjecting the mixed rich gases and distillate of benzol and other illuminants to a condensing and washing treatment in order to remove ammonia and other impurities.

15. The method of producing a high illuminating-gas from coke-ovens which consists in drawing off separately the rich and poor gases produced in a multiple series of ovens, subjecting the poor gases to a condensing and washing operation to eliminate tars and other impurities, then scrubbing the purified poor gases with oil to eliminate and absorb the benzol and other soluble illuminants contained in said gases, then distilling the oils to recover the absorbed benzol and illuminants and mixing the distillate without further condensation with the rich gases from the ovens and finally subjecting the mixed rich gases and distillate of benzol and other illuminants to a condensing and washing treatment in order to remove ammonia and other impurities.

16. The method of producing a rich illuminating-gas from gases generated in a series of generators which consists in separating the richer and poorer gases produced, extracting the benzol and other illuminants from the poorer gas, mixing them with the richer gas, subjecting the mixture to a condensing and purifying treatment, distilling the tar produced by condensation from the mixed gases and mixing the lighter distillate from said tars with the enriched gas.

17. The method of producing a rich illuminating-gas from gases generated in a series of generators which consists in separating the richer and poorer gases produced, extracting the benzol and other illuminants from the poorer gas by washing it with oils, distilling said oils to drive off the absorbed benzol and other illuminants and at the same time passing a current of gas through the still, mixing the gas and vapors of benzol and other illuminants from the still with the richer gas and subjecting the enriched gas to a condensing and washing operation to fit it for use.

18. The method of enriching gas which consists in scrubbing a portion with oils having the property of absorbing benzol and other illuminants in order to extract the benzol in said portion, then subjecting said oils to distillation at a temperature sufficiently high to
5 drive off carbon bisulfid, then subjecting said oils to distillation at a temperature sufficiently high to drive off the benzol and other illuminants and finally mixing said benzol with a volume of gas in order to enrich it.

F. W. C. SCHNIEWIND.

Witnesses:
CHAS. F. MYERS,
D. STEWART.